(12) United States Patent
Hagood, IV

(10) Patent No.: US 7,742,215 B2
(45) Date of Patent: Jun. 22, 2010

(54) METHODS AND APPARATUS FOR SPATIAL LIGHT MODULATION

(75) Inventor: Nesbitt W. Hagood, IV, Wellesley, MA (US)

(73) Assignee: Pixtronix, Inc., Andover, MA (US)

( * ) Notice: Subject to any disclaimer, the term of this patent is extended or adjusted under 35 U.S.C. 154(b) by 0 days.

(21) Appl. No.: 11/981,168

(22) Filed: Oct. 30, 2007

(65) Prior Publication Data

US 2008/0062500 A1 Mar. 13, 2008

Related U.S. Application Data

(63) Continuation-in-part of application No. 11/218,690, filed on Sep. 2, 2005, now Pat. No. 7,417,782.

(60) Provisional application No. 60/676,053, filed on Apr. 29, 2005, provisional application No. 60/655,827, filed on Feb. 23, 2005.

(51) Int. Cl.
G02B 26/02 (2006.01)
G02B 26/00 (2006.01)

(52) U.S. Cl. ..................... 359/233; 359/290

(58) Field of Classification Search ............... 359/198, 359/214, 224, 290, 295, 198.1, 199.2, 199.4, 359/200.6, 200.8, 224.1, 230, 233
See application file for complete search history.

(56) References Cited

U.S. PATENT DOCUMENTS

| | | | |
|---|---|---|---|
| 4,564,836 A | 1/1986 | Vuilleumier et al. | |
| 5,062,689 A | 11/1991 | Koehler | |
| 5,096,279 A | 3/1992 | Hornbeck et al. | |
| 5,142,405 A | 8/1992 | Hornbeck | |
| 5,233,459 A | 8/1993 | Bozler et al. | |
| 5,319,491 A | 6/1994 | Selbrede | |
| 5,379,135 A | 1/1995 | Nakagaki et al. | |
| 5,504,389 A | 4/1996 | Dickey | |
| 5,517,347 A | 5/1996 | Sampsell | |
| 5,745,281 A * | 4/1998 | Yi et al. | ................... 359/290 |
| 5,771,321 A | 6/1998 | Stern | |
| 5,781,331 A | 7/1998 | Carr et al. | |
| 5,784,189 A | 7/1998 | Bozler et al. | |
| 5,794,761 A | 8/1998 | Renaud et al. | |
| 5,835,256 A | 11/1998 | Huibers | |
| 5,986,796 A | 11/1999 | Miles | |
| 6,034,807 A | 3/2000 | Little et al. | |
| 6,040,937 A | 3/2000 | Miles | |

(Continued)

FOREIGN PATENT DOCUMENTS

EP 1093142 4/2001

(Continued)

OTHER PUBLICATIONS

Wang et al, "Highly Space-Efficient Electrostatic Zigzag Transmissive Micro-Optic Switches for an Integrated MEMS Optical Display System," Transducers 03 Conference.

(Continued)

*Primary Examiner*—William C Choi
(74) *Attorney, Agent, or Firm*—Ropes & Gray LLP

(57) ABSTRACT

The invention relates to methods and apparatus for forming images on a display utilizing a control matrix to control the movement of MEMs-based light modulators.

7 Claims, 8 Drawing Sheets

U.S. PATENT DOCUMENTS

| | | | |
|---|---|---|---|
| 6,046,840 A | 4/2000 | Huibers | |
| 6,201,633 B1 | 3/2001 | Peeters et al. | |
| 6,288,824 B1 * | 9/2001 | Kastalsky | 359/254 |
| 6,300,154 B2 | 10/2001 | Clark et al. | |
| 6,323,834 B1 | 11/2001 | Colgan et al. | |
| 6,411,423 B2 | 6/2002 | Ham et al. | |
| 6,574,033 B1 | 6/2003 | Chui et al. | |
| 6,583,915 B1 | 6/2003 | Hong et al. | |
| 6,600,474 B1 | 7/2003 | Heines et al. | |
| 6,650,455 B2 | 11/2003 | Miles | |
| 6,671,078 B2 | 12/2003 | Flanders et al. | |
| 6,674,562 B1 | 1/2004 | Miles | |
| 6,680,792 B2 | 1/2004 | Miles | |
| 6,701,039 B2 | 3/2004 | Bourgeois et al. | |
| 6,741,377 B2 | 5/2004 | Miles | |
| 6,775,048 B1 | 8/2004 | Starkweather et al. | |
| 6,798,935 B2 | 9/2004 | Bourgeois et al. | |
| 6,844,959 B2 | 1/2005 | Huibers et al. | |
| 6,906,847 B2 | 6/2005 | Huibers et al. | |
| 6,911,891 B2 | 6/2005 | Qiu et al. | |
| 6,947,195 B2 | 9/2005 | Ohtaka et al. | |
| 6,961,167 B2 | 11/2005 | Prins et al. | |
| 6,969,635 B2 | 11/2005 | Patel et al. | |
| 7,042,618 B2 | 5/2006 | Selbrede et al. | |
| 7,050,219 B2 | 5/2006 | Kimura et al. | |
| 7,057,790 B2 | 6/2006 | Selbrede | |
| 7,075,702 B2 | 7/2006 | Huibers et al. | |
| 7,092,142 B2 | 8/2006 | Selebrede et al. | |
| 7,119,944 B2 | 10/2006 | Patel et al. | |
| 7,123,796 B2 | 10/2006 | Steckl et al. | |
| 7,215,459 B2 | 5/2007 | Huibers et al. | |
| 7,227,677 B2 | 6/2007 | Ravnkilde et al. | |
| 7,271,945 B2 | 9/2007 | Hagood et al. | |
| 7,274,416 B2 | 9/2007 | Feenstra et al. | |
| 7,304,785 B2 | 12/2007 | Hagood et al. | |
| 7,304,786 B2 | 12/2007 | Hagood et al. | |
| 7,365,897 B2 | 4/2008 | Hagood et al. | |
| 7,391,552 B2 | 6/2008 | Barton et al. | |
| 7,405,852 B2 | 7/2008 | Hagood et al. | |
| 7,417,782 B2 | 8/2008 | Hagood et al. | |
| 7,460,290 B2 | 12/2008 | Hagood et al. | |
| 7,463,227 B2 | 12/2008 | Van Gorkom | |
| 7,502,159 B2 | 3/2009 | Hagood et al. | |
| 2004/0051929 A1 | 3/2004 | Sampsell et al. | |
| 2004/0080484 A1 | 4/2004 | Heines et al. | |
| 2005/0088404 A1 | 4/2005 | Heines et al. | |
| 2005/0104804 A1 | 5/2005 | Feenstra et al. | |
| 2005/0212734 A1 | 9/2005 | Kimura | |
| 2005/0275072 A1 | 12/2005 | Haluzak et al. | |
| 2006/0001942 A1 | 1/2006 | Chui et al. | |
| 2006/0033676 A1 | 2/2006 | Faase et al. | |
| 2006/0187190 A1 | 8/2006 | Hagood et al. | |
| 2006/0187191 A1 | 8/2006 | Hagood et al. | |
| 2006/0209012 A1 | 9/2006 | Hagood | |
| 2006/0250676 A1 | 11/2006 | Hagood | |
| 2006/0256039 A1 | 11/2006 | Hagood et al. | |
| 2006/0291771 A1 | 12/2006 | Braunisch et al. | |
| 2007/0031097 A1 | 2/2007 | Heikenfeld et al. | |
| 2007/0086078 A1 | 4/2007 | Hagood et al. | |
| 2007/0091038 A1 | 4/2007 | Hagood et al. | |
| 2007/0195026 A1 | 8/2007 | Hagood et al. | |
| 2007/0205969 A1 | 9/2007 | Hagood et al. | |
| 2007/0216987 A1 | 9/2007 | Hagood et al. | |
| 2007/0279727 A1 | 12/2007 | Gandhi et al. | |
| 2008/0030827 A1 | 2/2008 | Hagod et al. | |
| 2008/0037104 A1 | 2/2008 | Hagood et al. | |
| 2008/0062500 A1 | 3/2008 | Hagood | |
| 2008/0094853 A1 | 4/2008 | Kim et al. | |
| 2008/0129681 A1 | 6/2008 | Hagood et al. | |
| 2008/0145527 A1 | 6/2008 | Hagood et al. | |
| 2008/0158635 A1 | 7/2008 | Hagood et al. | |
| 2008/0158636 A1 | 7/2008 | Hagood et al. | |
| 2008/0174532 A1 | 7/2008 | Lewis | |
| 2008/0278798 A1 | 11/2008 | Hagood et al. | |
| 2008/0283175 A1 | 11/2008 | Hagood et al. | |
| 2009/0034052 A1 | 2/2009 | Hagood et al. | |

FOREIGN PATENT DOCUMENTS

| | | |
|---|---|---|
| WO | WO-2006017129 | 2/2006 |

OTHER PUBLICATIONS

Ravnkilde et al, "Fabrication of Nickel Microshutter Arrays for Spatial Light Modulation" Meso 2002.

Legtenberg et al, "Electrostatic Curved Electrode Actuators," Journal of Microelectromechanical Systems, 6:3(257-65)(Sep. 1997).

Li et al, "Drie-Fabricated Curved-Electrode Zipping Actuators with Low Pull-In Voltage," IEE, 480-483 (2003).

Judy, M. W., "Micromechanisms Using Sidewall Beams," Dissertation 1994.

J.P. Conde, et al., "Low-temperature Thin-film Silicon MEMS", in Thin Solid Films 427, p. 181 (2003).

J.P. Conde, et. al., "Amorphous and microcrystalline silicon deposited by hot-wire chemical vapor deposition at low substrate temperatures: application to devices and thin-film microelectromechanical systems", in Thin Solid Films 395, p. 105 (2001).

Boucinha et al. Air-gap amorphous silicon thin film transistors. Applied Physics Letters. 73:4, 502-4 (1998).

Feenstra et al., "Electrowetting Displays," Liquavista BV, http://www.liquavista.com/documents/electrowetting_displays_whitepaper.pdf, Retrieved on Aug. 17, 2006.

Kim et al. Manufacturing Technologies for the Next Generation a-Si TFT-LCD. Proceedings of the Int'l. Display Mfg. Cnf. Seoul, Koreo. (2000).

Park et al. P-70: Active Matrix OLED Displays Using Simple Poly-Si TFT Process. Society of Information Display, Digest. pp. 487-489 (2003).

den Boer, "Active Matrix Liquid Crystal Displays," Elsevier Science & Technology Books, ISBN #0750678135, Aug. 2005.

* cited by examiner

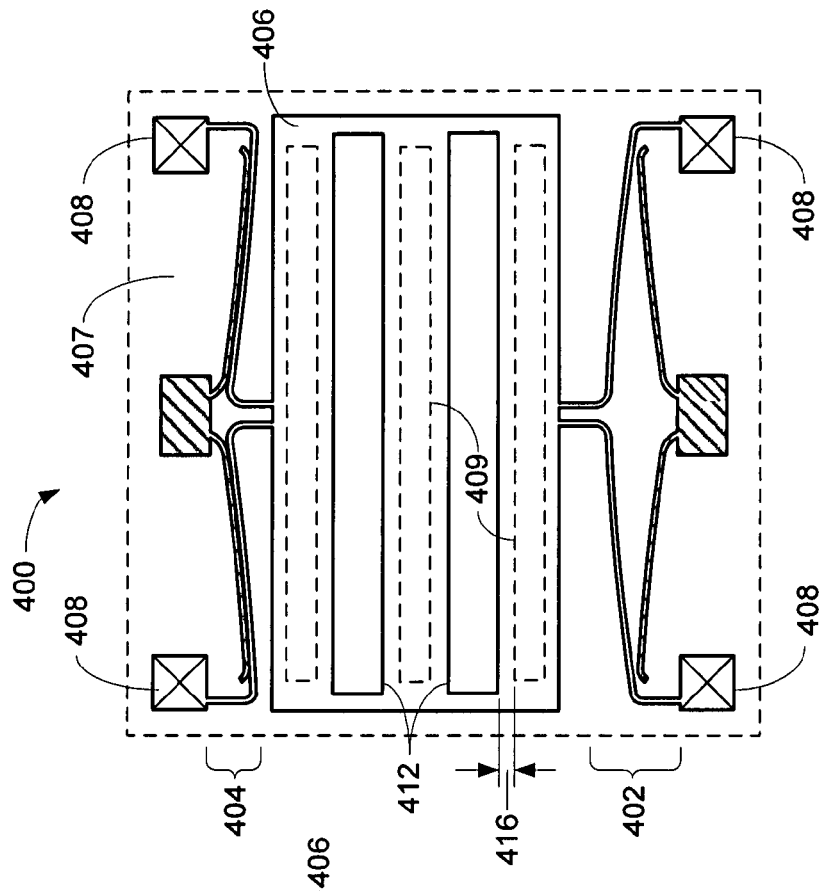
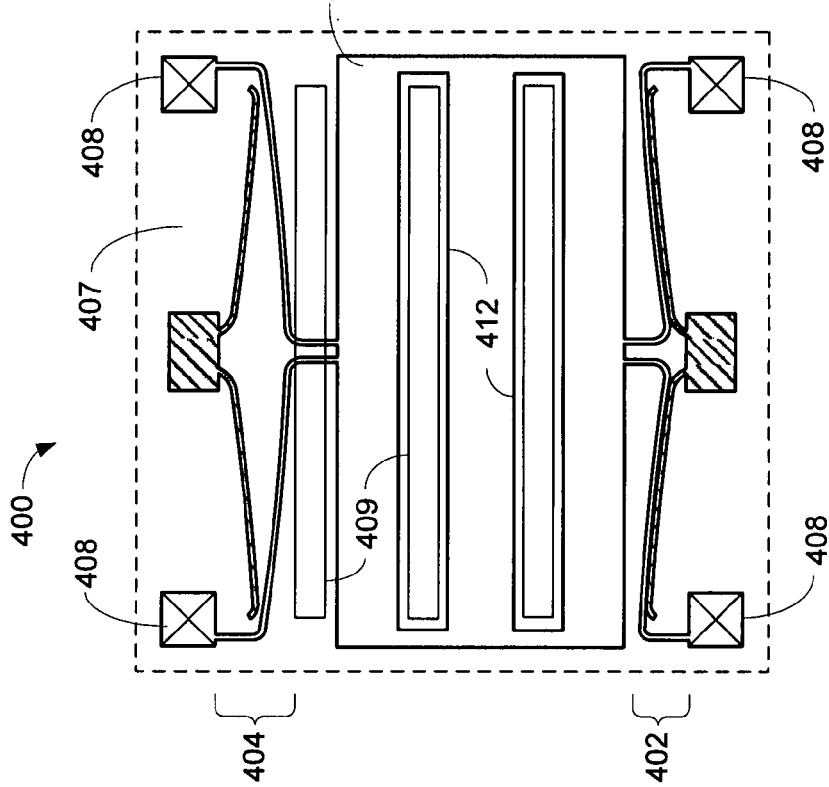
Fig. 4A
Fig. 4B

METHODS AND APPARATUS FOR SPATIAL LIGHT MODULATION

CROSS-REFERENCE TO RELATED APPLICATIONS

This application is a continuation-in-part of U.S. patent application Ser. No. 11/218,690, entitled "Methods and Apparatus for Spatial Light Modulation" and filed Sep. 2, 2005, which claims priority to and benefit of, U.S. Provisional Patent Application No. 60/676,053, entitled "MEMS Based Optical Display" and filed on Apr. 29, 2005; and U.S. Provisional Patent Application No. 60/655,827, entitled MEMS Based Optical Display Modules" and filed on Feb. 23, 2005. The entirety of each of these applications is incorporated by reference herein.

FIELD OF THE INVENTION

In general, the invention relates to the field of imaging displays, in particular, the invention relates to shutter-based MEMS projection displays

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Prior art projection displays have been designed to operate with reflective light modulator arrays. An example is the digital micromirror array, as described in U.S. Pat. No. 6,323,982 and liquid-crystal-on-silicon (LCOS) light modulator arrays, as described in U.S. Pat. No. 5,777,789. Because of the reflective nature of these prior art displays, the optical system necessarily incorporates a folded design, wherein the path for incident light (from the collector) and reflected light (to the projector) are both directed toward the same modulator surface. It is difficult to design an economical and efficient optical system for a projection display comprising reflective modulators, because of the folded nature of the optical path.

U.S. Pat. No. 4,904,061 describes a projection display based on transmissive liquid crystal modulator arrays. In this prior art projection display three independent transmissive light modulation assemblies are employed, one each for modulation of a red, green, and blue light. The separate red, green, and blue images are combined before the projection lens inside of a dichroic prism. A field sequential color method is not possible in these displays because of the relatively slow switching times inherent in the liquid crystal display. The economic advantages of this display are thus partially diminished by the need for three separate modulator assemblies.

Thus, there is a need in the art for fast, bright, low-powered mechanically actuated projection displays requiring less complicated optical paths.

SUMMARY OF THE INVENTION

The invention relates to projection displays that provide such features by incorporating shutter-based MEMS light modulators formed on a transparent substrate. The light modulators operate in a transmissive mode and fast enough to handle field-sequential color gray scale techniques. For example, they are fast enough to be able to modulate light transmitted through a color wheel. The combination of these features enable a compact, power efficient, reduced-cost, optical system for projection displays.

According to one aspect, the invention relates to a projection display that includes a plurality of shutter-based MEMS light modulators disposed on a surface of a transparent substrate. The shutter-based light modulators include shutters configured for motion limited substantially to a plane that is parallel to the surface of the transparent substrate. The projection display also includes projection optics for projecting light modulated by the shutter-based MEMS light modulators onto a display surface to form an image. In one embodiment, the projection display includes a color wheel for generating a sequence of colors of light for modulation by the shutter based MEMS light modulators.

In one embodiment, the shutter-based light modulators include mechanical supports coupled to the shutters to limit motion of the shutters in a direction normal to the plane of a surface of the transparent substrate. In one particular embodiment, the mechanical supports are taller than they are wide. The mechanical supports may also be part of a spring or an electrostatic actuator for causing the motion of the shutters. At least one mechanical support in each light modulator is anchored to the transparent substrate at least two locations to reduce rotational movement of the shutter.

According to another aspect, the invention relates to a projection display that includes a plurality of shutter-based MEMS light modulators disposed on a surface of a transparent substrate. The shutter-based light modulators include shutters which have at least one slotted aperture formed therein for allowing the passage of light through the shutter. In one embodiment, each shutter has multiple slotted apertures. The projection display also includes an aperture layer including a plurality of apertures. The slotted apertures in the shutters correspond to respective apertures in the aperture layer. The aperture layer may be formed from a light blocking material. In such embodiments, each light modulator comprises an actuator for displacing a shutter attached thereto in a plane that is parallel to the transparent substrate, thereby aligning a slotted aperture with its corresponding aperture in the aperture layer.

The projection display also includes projection optics for projecting light modulated by the shutter-based MEMS light modulators onto a display surface to form an image. In one embodiment, the projection display includes a color wheel for generating a sequence of colors of light for modulation by the shutter based MEMS light modulators.

According to a further aspect, the invention relates to a projection display that includes a plurality of shutter-based MEMS light modulators disposed on a surface of a transparent substrate. The shutter-based light modulators include actuators for driving respective shutters. The actuators include opposing compliant beams, which, in response to the application of a voltage across the beams, deform towards one another.

In one embodiment, at least one of the compliant beams in each actuator is free at one end to move towards the other compliant beam in response to the application of the voltage. The other beam is coupled to the shutter and the transparent substrate.

The compliant beams are preferably narrow. In one embodiment, the compliant beams have a dimension in the plane of the surface of the transparent substrate that is less than about 2.0 microns. Partially as a result, the compliant beams are compliant in a direction parallel to the surface of the transparent substrate and substantially rigid in a direction normal to the transparent substrate.

The projection display also includes projection optics for projecting light modulated by the shutter-based MEMS light modulators onto a display surface to form an image. In one embodiment, the projection display includes a color wheel for generating a sequence of colors of light for modulation by the shutter based MEMS light modulators.

According to yet another aspect, the invention relates to a projection display that includes a plurality of shutter-based MEMS light modulators disposed on a surface of a transparent substrate. Each shutter-based light modulator includes a beams for supporting a corresponding light modulating shutter. The beams have a dimension parallel to the surface of the transparent substrate that is less than about 2.0 microns. In one embodiment, the beams have a dimension parallel to the surface of the transparent substrate that is about 0.2 microns. Preferably, the beam is at least 1.4 times as tall as it is wide. Partially as a result, the compliant beams are compliant in a direction parallel to the surface of the transparent substrate and substantially rigid in a direction normal to the transparent substrate.

The projection display also includes projection optics for projecting light modulated by the shutter-based MEMS light modulators onto a display surface to form an image. In one embodiment, the projection display includes a color wheel for generating a sequence of colors of light for modulation by the shutter based MEMS light modulators.

BRIEF DESCRIPTION OF THE DRAWINGS

The foregoing discussion will be understood more readily from the following detailed description of the invention with reference to the following drawings:

FIGS. 4A and 4B are plan views of a dual-actuated shutter assembly in the open and closed states respectively, according to an illustrative embodiment of the invention;

DESCRIPTION OF CERTAIN ILLUSTRATIVE EMBODIMENTS

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1A:
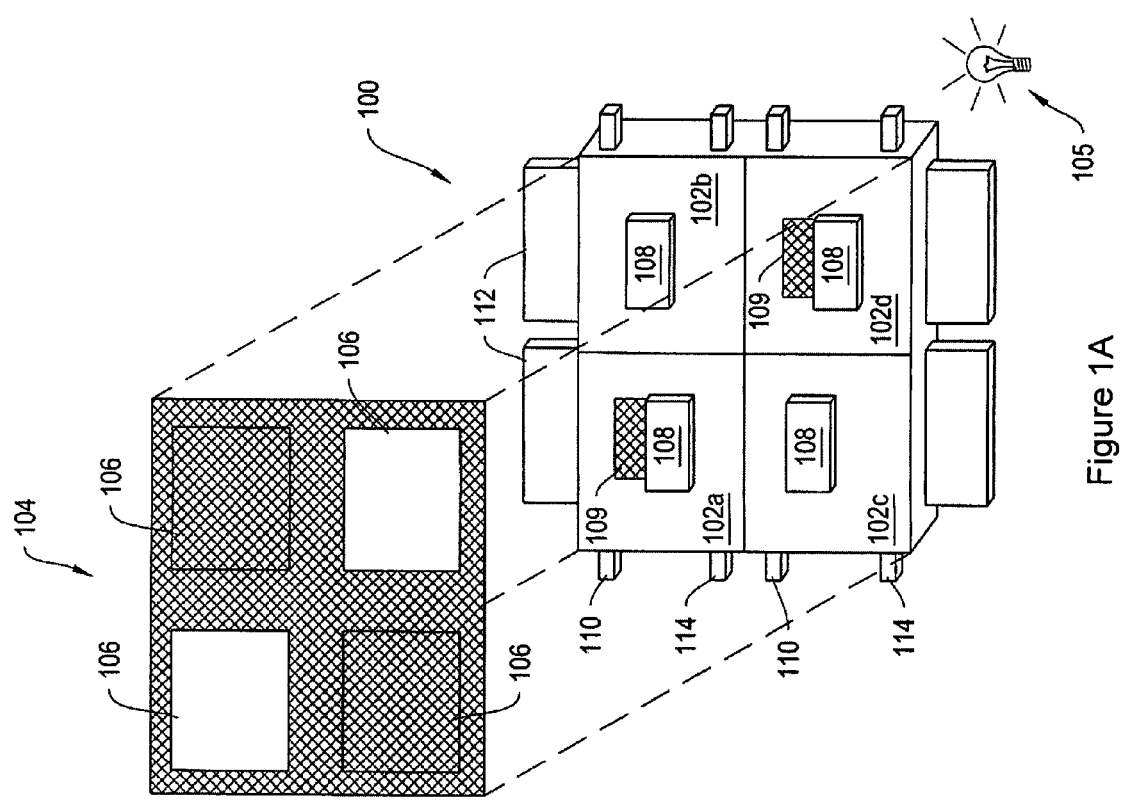
FIG. 1A is an isometric view of display apparatus, according to an illustrative embodiment of the invention.

FIG. 1A is a schematic diagram of a direct-view MEMS-based display apparatus 100, according to an illustrative embodiment of the invention. The display apparatus 100 includes a plurality of light modulators 102a-102d (generally "light modulators 102") arranged in rows and columns. In the display apparatus 100, light modulators 102a and 102d are in the open state, allowing light to pass. Light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e. by use of a frontlight. In one of the closed or open states, the light modulators 102 interfere with light in an optical path by, for example, and without limitation, blocking, reflecting, absorbing, filtering, polarizing, diffracting, or otherwise altering a property or path of the light.

In the display apparatus 100, each light modulator 102 corresponds to a pixel 106 in the image 104. In other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide grayscale in an image 104. With respect to an image, a "pixel" corresponds to the smallest picture element defined by the resolution of the image. With respect to structural components of the display apparatus 100, the term "pixel" refers to the combined mechanical and electrical components utilized to modulate the light that forms a single pixel of the image.

Display apparatus 100 is a direct-view display in that it does not require imaging optics. The user sees an image by looking directly at the display apparatus 100. In alternate embodiments the display apparatus 100 is incorporated into a projection display. In such embodiments, the display forms an image by projecting light onto a screen or onto a wall. In projection applications the display apparatus 100 is substantially smaller than the projected image 104.

Direct-view displays may operate in either a transmissive or reflective mode. In a transmissive display, the light modulators filter or selectively block light which originates from a lamp or lamps positioned behind the display. The light from the lamps is optionally injected into a light guide or "backlight". Transmissive direct-view display embodiments are often built onto transparent or glass substrates to facilitate a sandwich assembly arrangement where one substrate, containing the light modulators, is positioned directly on top of the backlight. In some transmissive display embodiments, a color-specific light modulator is created by associating a color filter material with each modulator 102. In other transmissive display embodiments colors can be generated, as described below, using a field sequential color method by alternating illumination of lamps with different primary colors.

Each light modulator 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material.

The display apparatus also includes a control matrix connected to the substrate and to the light modulators for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
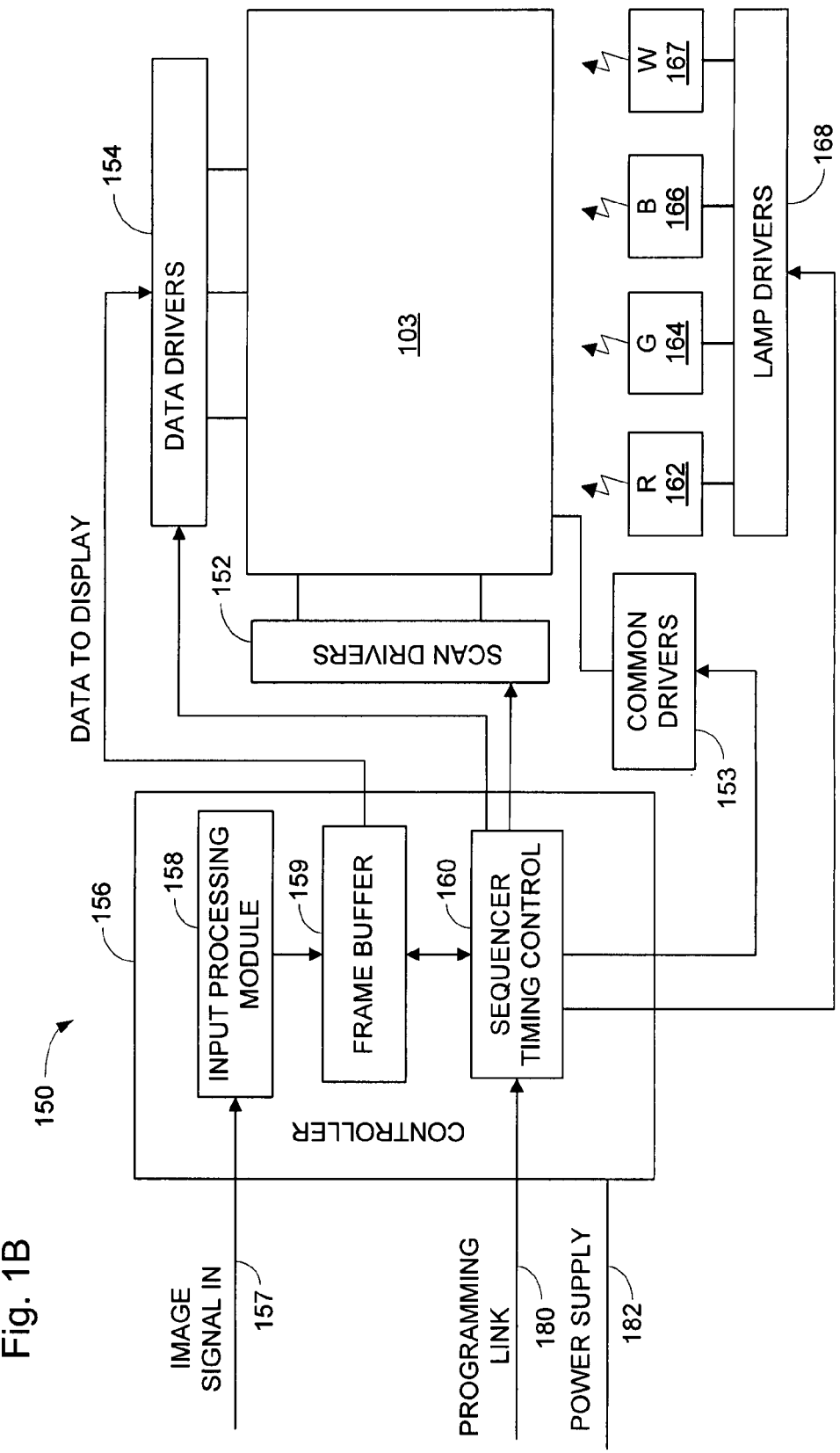
FIG. 1B is a block diagram of the display apparatus of FIG. 1A, according to an illustrative embodiment of the invention.

FIG. 1B is a block diagram 150 of the display apparatus 100. Referring to FIGS. 1A and 1B, in addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some embodiments of the display apparatus, the data drivers 154 are configured to provide analog data voltages to the light modulators, especially where the gray scale of the image 104 is to be derived in analog fashion. In analog operation the light modulators 102 are designed such that when a range of intermediate voltages is applied through the data interconnects 112 there results a range of intermediate open states in the shutters 108 and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller 156 includes an input processing module 158, which processes an incoming image signal 157 into a digital image format appropriate to the spatial addressing and the gray scale capabilities of the display 100. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

The display 100 apparatus optionally includes a set of common drivers 153, also referred to as common voltage sources. In some embodiments the common drivers 153 provide a DC common potential to all light modulators within the array of light modulators 103, for instance by supplying voltage to a series of common interconnects 114. In other embodiments the common drivers 153, following commands from the controller 156, issue voltage pulses or signals to the array of light modulators 103, for instance global actuation pulses which are capable of driving and/or initiating simultaneous actuation of all light modulators in multiple rows and columns of the array 103.

All of the drivers (e.g., scan drivers 152, data drivers 154, and common drivers 153) for different display functions are time-synchronized by a timing-control module 160 in the controller 156. Timing commands from the module 160 coordinate the illumination of red, green and blue and white lamps (162, 164, 166, and 167 respectively) via lamp drivers 168, the write-enabling and sequencing of specific rows within the array of pixels 103, the output of voltages from the data drivers 154, and the output of voltages that provide for light modulator actuation.

The controller 156 determines the sequencing or addressing scheme by which each of the shutters 108 in the array 103 can be re-set to the illumination levels appropriate to a new image 104. Details of suitable addressing, image formation, and gray scale techniques can be found in U.S. patent application Ser. Nos. 11/326,696 and 11/643,042, incorporated herein by reference. New images 104 can be set at periodic intervals. For instance, for video displays, the color images 104 or frames of video are refreshed at frequencies ranging from 10 to 300 Hertz. In some embodiments the setting of an image frame to the array 103 is synchronized with the illumination of the lamps 162, 164, and 166 such that alternate image frames are illuminated with an alternating series of colors, such as red, green, and blue. The image frames for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 156 determines the addressing sequence and/or the time intervals between image frames to produce images 104 with appropriate gray scale. The process of generating varying levels of grayscale by controlling the amount of time a shutter 108 is open in a particular frame is referred to as time division gray scale. In one embodiment of time division gray scale, the controller 156 determines the time period or the fraction of time within each frame that a shutter 108 is allowed to remain in the open state, according to the illumination level or gray scale desired of that pixel. In other implementations, for each image frame, the controller 156 sets a plurality of sub-frame images in multiple rows and columns of the array 103, and the controller alters the duration over which each sub-frame image is illuminated in proportion to a gray scale value or significance value employed within a coded word for gray scale. For instance, the illumination times for a series of sub-frame images can be varied in proportion to the binary coding series 1, 2, 4, 8 . . . . The shutters 108 for each pixel in the array 103 are then set to either the open or closed state within a sub-frame image according to the value at a corresponding position within the pixel's binary coded word for gray level.

In other implementations, the controller alters the intensity of light from the lamps 162, 164, and 166 in proportion to the gray scale value desired for a particular sub-frame image. A number of hybrid techniques are also available for forming colors and gray scale from an array of shutters 108. For instance, the time division techniques described above can be combined with the use of multiple shutters 108 per pixel, or the gray scale value for a particular sub-frame image can be established through a combination of both sub-frame timing and lamp intensity. Details of these and other embodiments can be found in U.S. patent application Ser. No. 11/643,042, referenced above.

In some implementations the data for an image state 104 is loaded by the controller 156 to the modulator array 103 by a sequential addressing of individual rows, also referred to as scan lines. For each row or scan line in the sequence, the scan driver 152 applies a write-enable voltage to the write enable interconnect 110 for that row of the array 103, and subsequently the data driver 154 supplies data voltages, corresponding to desired shutter states, for each column in the selected row. This process repeats until data has been loaded for all rows in the array. In some implementations the sequence of selected rows for data loading is linear, proceeding from top to bottom in the array. In other implementations the sequence of selected rows is pseudo-randomized, in order to minimize visual artifacts. And in other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array 103 is separated in time from the process of actuating the shutters 108. In these implementations, the modulator array 103 may include data memory elements for each pixel in the array 103 and the control matrix may include a global actuation interconnect for carrying trigger signals, from common driver 153, to initiate simultaneous actuation of shutters 108 according to data stored in the memory elements. Various addressing sequences, many of which are described in U.S. patent application Ser. No. 11/643,042, can be coordinated by means of the timing control module 160.

In alternative embodiments, the array of pixels 103 and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The display 100 is comprised of a plurality of functional blocks including the timing control module 160, the frame buffer 159, scan drivers 152, data drivers 154, and drivers 153 and 168. Each block can be understood to represent either a distinguishable hardware circuit and/or a module of executable code. In some implementations the functional blocks are provided as distinct chips or circuits connected together by means of circuit boards and/or cables. Alternately, many of these circuits can be fabricated along with the pixel array 103 on the same substrate of glass or plastic. In other implementations, multiple circuits, drivers, processors, and/or control functions from block diagram 150 may be integrated together within a single silicon chip, which is then bonded directly to the transparent substrate holding pixel array 103.

The controller 156 includes a programming link 180 by which the addressing, color, and/or gray scale algorithms, which are implemented within controller 156, can be altered according to the needs of particular applications. In some embodiments, the programming link 180 conveys information from environmental sensors, such as ambient light or temperature sensors, so that the controller 156 can adjust imaging modes or backlight power in correspondence with environmental conditions. The controller 156 also comprises a power supply input 182 which provides the power needed for lamps as well as light modulator actuation. Where necessary, the drivers 152 153, 154, and/or 168 may include or be associated with DC-DC converters for transforming an input voltage at 182 into various voltages sufficient for the actuation of shutters 108 or illumination of the lamps, such as lamps 162, 164, 166, and 167.

Figure 2A:
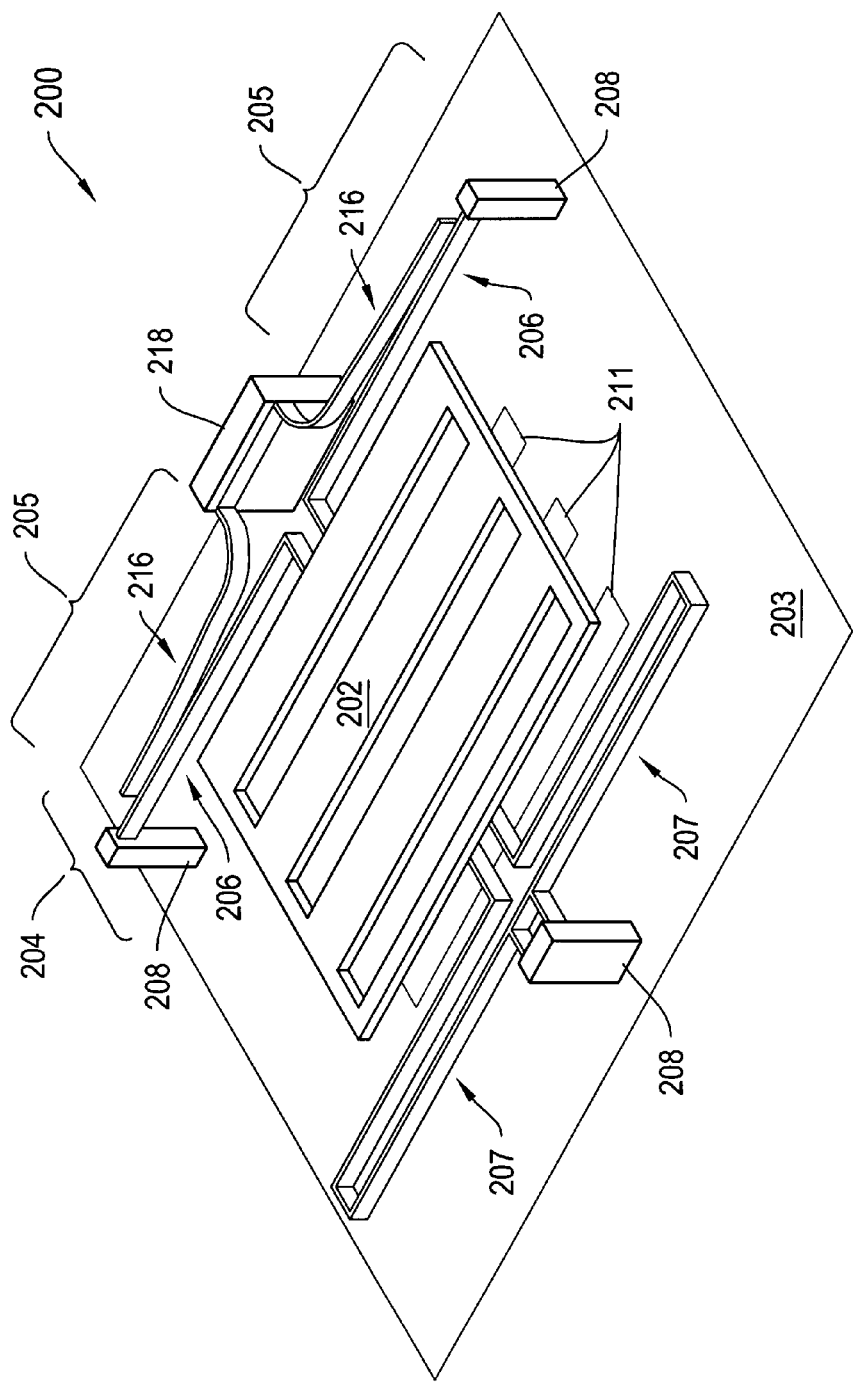
FIG. 2A is a perspective view of an illustrative shutter-based light modulator suitable for incorporation into the MEMS-based display of FIG. 1A, according to an illustrative embodiment of the invention.

FIG. 2A is a perspective view of an illustrative shutter-based light modulator 200 suitable for incorporation into the MEMS-based display apparatus 100 of FIG. 1A, according to an illustrative embodiment of the invention. The shutter-based light modulator 200 (also referred to as shutter assembly 200) includes a shutter 202 coupled to an actuator 204. The actuator 204 is formed from two separate compliant electrode beam actuators 205 (the "actuators 205"), as described in U.S. patent application Ser. No. 11/251,035, filed on Oct. 14, 2005. The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The load anchors 208 physically connect the compliant load beams 206 and the shutter 202 to the surface 203 and electrically connect the load beams 206 to a bias voltage, in some instances, ground.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

The shutter-based modulator 200 is sometimes referred to herein as a dual compliant-beam electrode actuator, which is formed from two beams, such as beams 206 and 216, each of which is least partially compliant. In response to applying a voltage across the beam electrodes, the beams 206 and 216 are attracted to one another from the resultant electrostatic forces. At least some portion of each of the beams can flex and or bend during actuation, such deformation being helpful for reducing the voltage required for actuation. In some implementations the compliance is achieved by the inclusion of flexures or pin joints. Some portion of the beams may be substantially rigid or fixed in place. Preferably, at least the majority of the length of each of the beams is compliant.

The surface 203 includes one or more apertures 211 for admitting the passage of light. If the shutter assembly 200 is formed on an opaque substrate, made for example from silicon, then the surface 203 is a surface of the substrate, and the apertures 211 are formed by etching an array of holes through the substrate. If the shutter assembly 200 is formed on a transparent substrate, made for example of glass or plastic, then the surface 203 is a surface of a light blocking layer deposited on the substrate, and the apertures are formed by etching the surface 203 into an array of holes 211. The apertures 211 can be generally circular, elliptical, polygonal, serpentine, or irregular in shape.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 is removed, the load beams 206 push the shutter 202 back into its initial position, releasing the stress stored in the load beams 206.

The shutter assembly 200, also referred to as an elastic shutter assembly, incorporates a passive restoring force, such as a spring, for returning a shutter to its rest or relaxed position after voltages have been removed. A number of elastic restore mechanisms and various electrostatic couplings can be designed into or in conjunction with electrostatic actuators, the compliant beams illustrated in shutter assembly 200 being just one example. Other examples are described in U.S. patent application Ser. Nos. 11/251,035 and 11/326,696, incorporated herein by reference. For instance, a highly non-linear voltage-displacement response can be provided which favors an abrupt transition between "open" vs "closed" states of operation, and which, in many cases, provides a bi-stable or hysteretic operating characteristic for the shutter assembly. Other electrostatic actuators can be designed with more incremental voltage-displacement responses and with considerably reduced hysteresis, as may be preferred for analog gray scale operation.

The shutter 202 as well as the spring 207 and the actuators 205 are formed from a distinct functional layer which includes the moving parts of the shutter assembly 200. The shutter 2002, the spring 207, and the actuators 205 may be formed from a deposited metal, such as, without limitation, Au, Cr or Ni, or a deposited semiconductor, such as, without limitation as polycrystalline silicon or amorphous silicon, or from single crystal silicon if formed on top of a buried oxide (also known as silicon on insulator). The beams 206 and 216 within actuator 205 are patterned to dimensions of about 1.0 to about 20 microns in width. In some embodiments, to reduce their stiffness, the beams are patterned with widths in the range of 0.2 to 2.0 microns. The shutter thickness is typically in the range of 0.5 microns to 10 microns. The compliant beams 206 and 216 are taller than they are wide, their height being in the range of 1.0 to 10 microns. In order to promote the in-plane movement of the shutters (i.e. reduce the transverse beam stiffness as opposed to the out-of-plane stiffness), it is preferable to maintain a beam dimensional ratio of at least 1.4:1, with the beams being taller than they are wide.

The actuator 205 within the elastic shutter assembly is said to operate between a closed or actuated position and a relaxed position. The designer, however, can choose to place apertures 211 such that shutter assembly 200 is in either the "open" state, i.e. passing light, or in the "closed" state, i.e. blocking light, whenever actuator 205 is in its relaxed position. For illustrative purposes, it is assumed below that elastic shutter assemblies described herein are designed to be open in their relaxed state.

In many cases it is preferable to provide a dual set of "open" and "closed" actuators as part of a shutter assembly so that the control electronics are capable of electrostatically driving the shutters into each of the open and closed states.

U.S. patent application Ser. Nos. 11/251,035 and 11/326,696 have described a variety of methods by which an array of shutters can be controlled via a control matrix to produce images, in many cases moving images, with appropriate gray scale. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 3A:
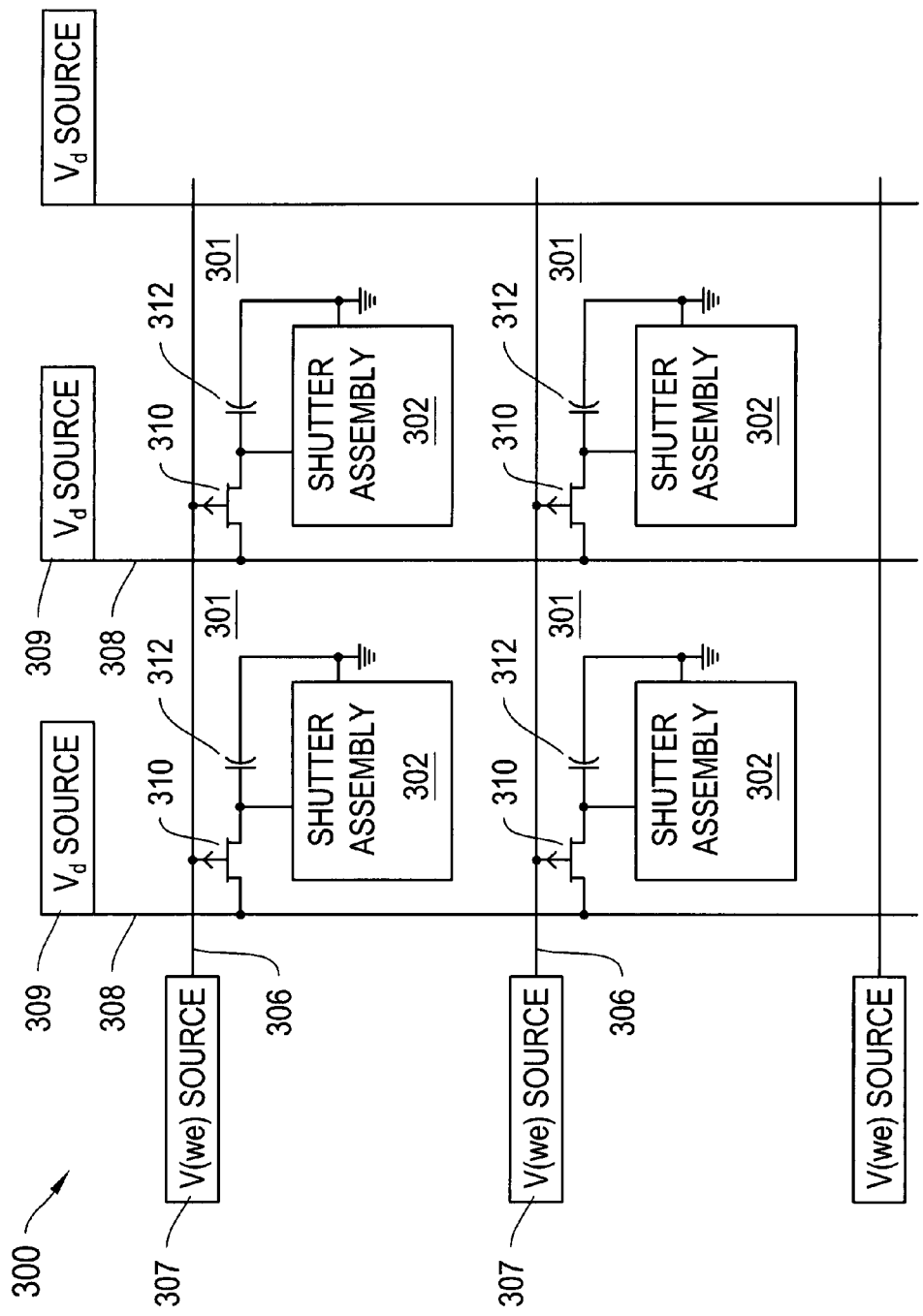
FIG. 3A is a schematic diagram of a control matrix suitable for controlling the light modulators incorporated into the MEMS-based display of FIG. 1A, according to an illustrative embodiment of the invention.
Figure 3B:
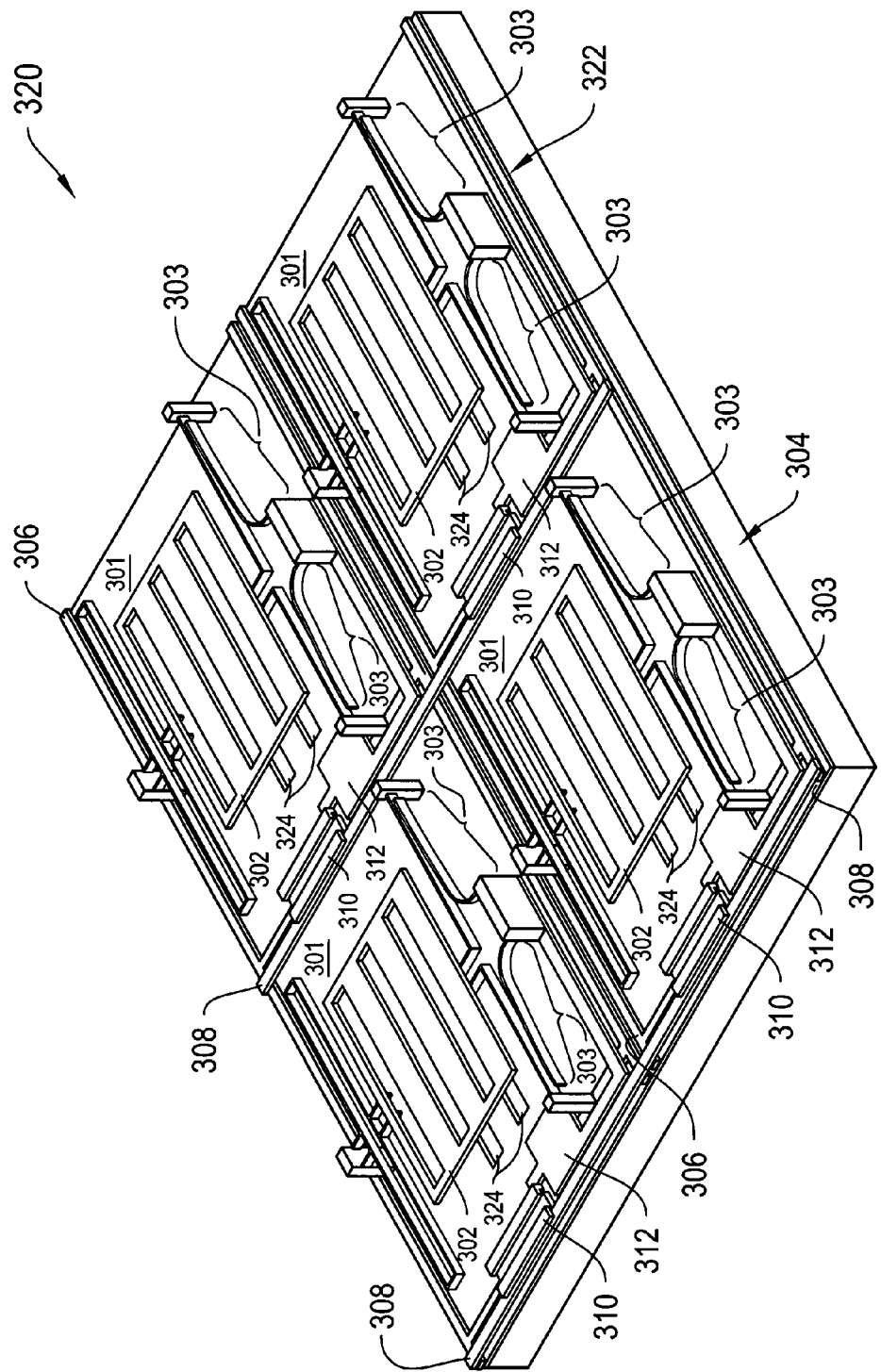
FIG. 3B is a perspective view of an array of shutter-based light modulators connected to the control matrix of FIG. 3A, according to an illustrative embodiment of the invention.

FIG. 3A is a schematic diagram of a control matrix 300 suitable for controlling the light modulators incorporated into the MEMS-based display apparatus 100 of FIG. 1A, according to an illustrative embodiment of the invention. FIG. 3B is a perspective view of an array 320 of shutter-based light modulators connected to the control matrix 300 of FIG. 3A, according to an illustrative embodiment of the invention. The control matrix 300 may address an array of pixels 320 (the "array 320"). Each pixel 301 includes an elastic shutter assembly 302, such as the shutter assembly 200 of FIG. 2A, controlled by an actuator 303. Each pixel also includes an aperture layer 322 that includes apertures 324. Further electrical and mechanical descriptions of shutter assemblies such as shutter assembly 302, and variations thereon, can be found in U.S. patent application Ser. Nos. 11/251,035 and 11/326,696. Descriptions of alternate control matrices can also be found in U.S. patent application Ser. No. 11/607,715.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source, ("Vd source") 309 to the pixels 301 in a corresponding column of pixels 301. In control matrix 300, the data voltage $V_d$ provides the majority of the energy necessary for actuation of the shutter assemblies 302. Thus, the data voltage source 309 also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. It is not necessary, therefore, to wait and hold the voltage $V_{we}$ on a row for times long enough for the shutter assembly 302 to actuate; such actuation can proceed after the write-enabling voltage has been removed from the row. The capacitors 312 also function as memory elements within the array 320, storing actuation instructions for periods as long as is necessary for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In one implementation the substrate 304 is made of a transparent material, such as glass or plastic. In another implementation the substrate 304 is made of an opaque material, but in which holes are etched to form the apertures 324.

Components of shutter assemblies 302 are processed either at the same time as the control matrix 300 or in subsequent processing steps on the same substrate. The electrical components in control matrix 300 are fabricated using many thin film techniques in common with the manufacture of thin film transistor arrays for liquid crystal displays. Available techniques are described in Den Boer, *Active Matrix Liquid Crystal Displays* (Elsevier, Amsterdam, 2005), incorporated herein by reference. The shutter assemblies are fabricated using techniques similar to the art of micromachining or from the manufacture of micromechanical (i.e., MEMS) devices. Many applicable thin film MEMS techniques are described in Rai-Choudhury, ed., Handbook of Microlithography, Micromachining & Microfabrication (SPIE Optical Engineering Press, Bellingham, Wash. 1997), incorporated herein by reference. Fabrication techniques specific to MEMS light modulators formed on glass substrates can be found in U.S. patent application Ser. Nos. 11/361,785 and 11/731,628, incorporated herein by reference. For instance, as described in those applications, the shutter assembly 302 can be formed from thin films of amorphous silicon, deposited by a chemical vapor deposition process.

The shutter assembly 302 together with the actuator 303 can be made bi-stable. That is, the shutters can exist in at least two equilibrium positions (e.g. open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 can also be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in shutter-based light modulator 200, or the opposing force may be exerted by an opposing actuator, such as an "open" or "closed" actuator.

The light modulator array 320 is depicted as having a single MEMS light modulator per pixel. Other embodiments are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

A variety of other shutter-based and non-shutter-based MEMS modulators can be substituted for the shutter assembly 302 within light modulator array 320. Examples of other MEMS light modulators include roller-based light modulators, light taps based on frustrated total internal reflection, electrowetting-based light modulators, and interference light modulators (IMODs).

FIGS. 4A and 4B illustrate an alternative shutter-based light modulator (shutter assembly) 400 suitable for inclusion in various embodiments of the invention. The light modulator 400 is an example of a dual actuator shutter assembly, and is shown in FIG. 4A in an open state. FIG. 4B is a view of the dual actuator shutter assembly 400 in a closed state. Shutter assembly 400 is described in further detail in U.S. patent application Ser. No. 11/251,035, referenced above. In contrast to the shutter assembly 200, shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of apertures 412 and 409 coincide. In FIG. 4B the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (shown as dotted lines).

Because the actuation voltage for a shutter assembly, such as shutter assembly 400, increases with the amount of displacement required between open and closed states, it is advantageous to provide multiple shutter apertures 412 within each shutter 406. The multiple shutter apertures 412 have a shorter dimension along the direction of shutter movement and a longer dimension along a direction that is perpendicular to the direction of shutter movement. Shutter apertures with this elongated aspect ratio are referred to as slotted apertures. By providing the shutter 406 with multiple slotted apertures 412 the total area for apertures in the open state is increased while the displacement distance between open and closed states is reduced.

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In other implementations the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$. A number of control matrices which take advantage of the bi-stable operation characteristic are described in U.S. patent application Ser. No. 11/607,715, referenced above.

Figure 5:
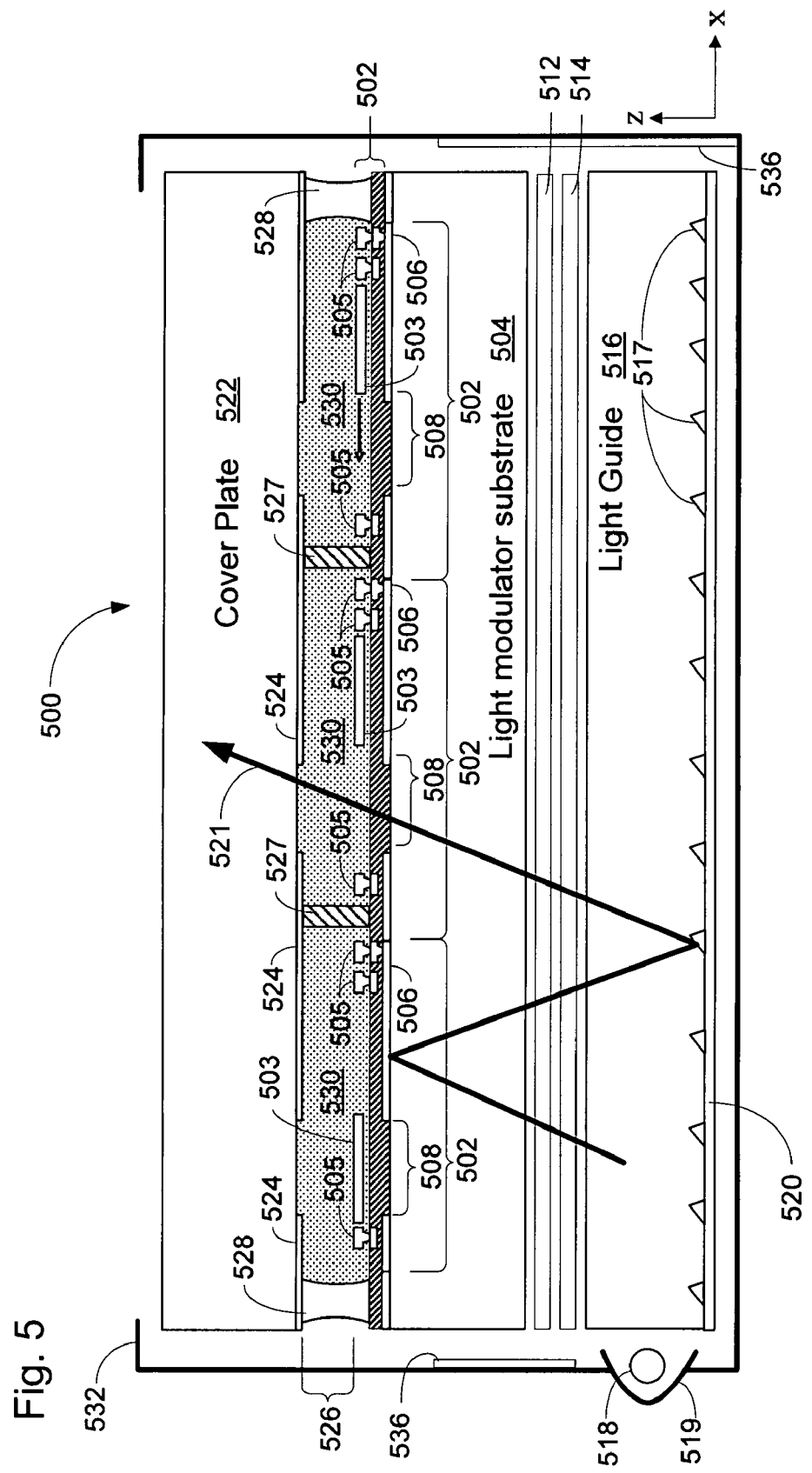
FIG. 5 is a cross-sectional view of a display apparatus, according to an illustrative embodiment of the invention.

FIG. 5 is a cross sectional view of a display apparatus 500 incorporating shutter-based light modulators (shutter assemblies) 502, according to an illustrative embodiment of the invention. Each shutter assembly incorporates a shutter 503 and an anchor 505. Not shown are the compliant beam actuators which, when connected between the anchors 505 and the shutters 503, help to suspend the shutters a short distance above the surface. The shutter assemblies 502 are disposed on a transparent substrate 504, preferably made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition. In another implementation, the rear-facing reflective layer 506 can be formed from a mirror, such as a dielectric mirror. A dielectric mirror is fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 shown in FIG. 4B.

The display apparatus 500 includes an optional diffuser 512 and/or an optional brightness enhancing film 514 which separate the substrate 504 from a planar light guide 516. The light guide is comprised of a transparent, i.e. glass or plastic material. The light guide 516 is illuminated by one or more light sources 518, forming a backlight. The light sources 518 can be, for example, and without limitation, incandescent lamps, fluorescent lamps, lasers, or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion light that fails to leave the display to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light re-directors can be molded into the plastic body of light guide 516 with shapes that can be alternately triangular, trapezoidal, or curved in cross section. The density of the prisms 517 generally increases with distance from the lamp 518.

In alternate embodiments the aperture layer 506 can be made of a light absorbing material, and in alternate embodiments the surfaces of shutter 503 can be coated with either a light absorbing or a light reflecting material. In alternate embodiments the aperture layer 506 can be deposited directly on the surface of the light guide 516. In alternate embodiments the aperture layer 506 need not be disposed on the same substrate as the shutters 503 and anchors 505 (see the MEMS-down configuration described below). These and other embodiments for a display illumination system are described in detail in the U.S. patent application Ser. Nos. 11/218,690 and 11/528,191, incorporated herein by reference.

In one implementation the light sources 518 can include lamps of different colors, for instance, the colors red, green, and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps or red, green, blue, and yellow lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a working fluid 530. The working fluid 530 is engineered with viscosities preferably below about 10 centipoise and with relative dielectric constant preferably above about 2.0, and dielectric breakdown strengths above about $10^4$ V/cm. The working fluid 530 can also serve as a lubricant. In one implementation, the working fluid 530 is a hydrophobic liquid with a high surface wetting capability. In alternate implementations the working fluid 530 has a refractive index that is either greater than or less than that of the substrate 504.

A sheet metal or molded plastic assembly bracket 532 holds the cover plate 522, the substrate 504, the backlight 516 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of light guide 516 back into the light guide. Not shown in FIG. 5 are electrical interconnects which provide control signals as well as power to the shutter assemblies 502 and the lamps 518.

Further details and alternate configurations for the display apparatus 500, including manufacturing methods therefore, can be found in the U.S. patent application Ser. Nos. 11/361, 785 and 11/731,628, incorporated herein by reference Display apparatus 500 is referred to as the MEMS-up configuration, wherein the MEMS based light modulators are formed on a front surface of substrate 504, i.e. the surface that faces toward the viewer. The shutter assemblies 502 are built directly on top of the reflective aperture layer 506. In an alternate embodiment of the invention, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in display apparatus 500 and is oriented such that the MEMS-based light modulators are positioned on the rear surface of the top substrate, i.e. the surface that faces away from the viewer and toward the back light 516. The MEMS-based light modulators are thereby positioned directly opposite to and across a gap from the reflective aperture layer. The gap can be maintained by a series of spacer posts connecting the aperture plate and the substrate on which the MEMS modulators are formed. In some implementations the spacers are disposed within or between each pixel in the array. The gap or distance that separates the MEMS light modulators from their corresponding apertures is preferably less than 10 microns, or a distance that is less than the overlap between shutters and apertures, such as overlap 416. Further details and alternate embodiments for the MEMS-down display configuration can be found in the U.S. patent application Ser. Nos. 11/361,785, 11/528,191, and 11/731,628 referenced above.

In other embodiments a roller-based light modulator, light tap modulators, or electrowetting-based light modulators, as well as other MEMS-based light modulators, can be substituted for the shutter assemblies 502 within the display assembly 500.

In display assembly 500, the combination of light modulator substrate 504, cover plate 522, spacers 527, working fluid 530 and seal material 528 are said to make up a cell assembly. A functioning light modulation assembly can be fabricated from the cell assembly by electrically connecting driver and control circuitry, whose function is illustrated in block diagram 150, to modulator substrate 504.

Figure 6:
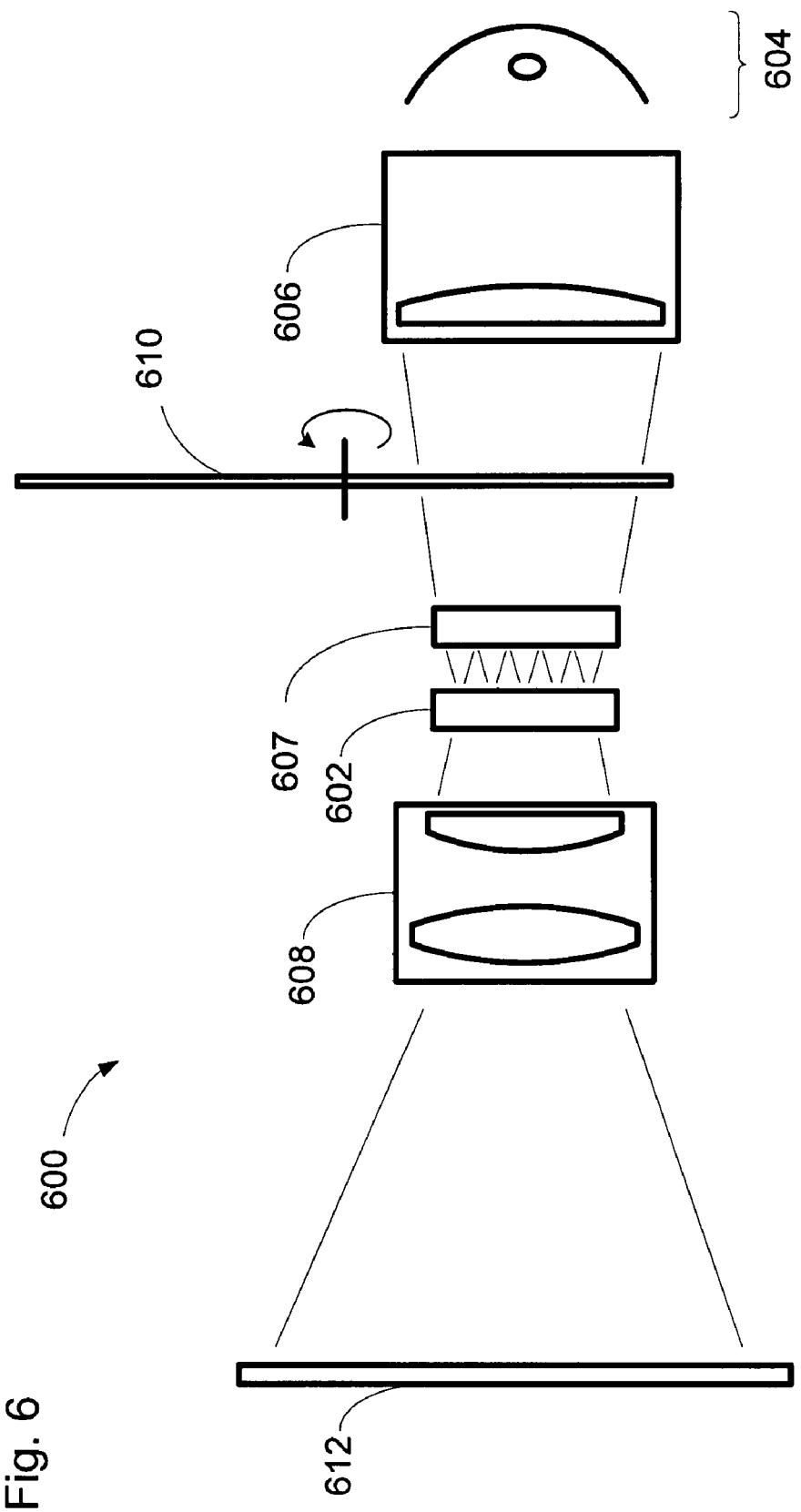
FIG. 6 is a schematic diagram of a MEMS shutter-based projection display, according to an illustrative embodiment of the invention.

FIG. 6 is a schematic diagram of a MEMS shutter-based projection display, 600, according to an illustrative embodiment of the invention. The projection optical system comprises a lamp 604, collection optics 606, a microlens array 607, projection optics 608, a color wheel 610, and a display screen 612. The light modulation assembly 602 can be assembled from the combination of light modulator substrate 504, cover plate 522, spacers 527, working fluid 530, seal material 528, along with the addition of driver and control circuitry.

The light from the lamp 604 is focused or concentrated onto the light modulation assembly 602 by the combination of collection optics 606 and the microlens array 607. The light modulation assembly, having been fabricated on transparent substrates, operates in the transmissive mode. The light modulation assembly 602 acts as the object plane for projection optics 606. Lenses within the projection optics 606 both transfer and expand the image for viewing on display screen 612. A color wheel 610 provides a sequence of color filters with which to alter the illumination of the modulation assembly 602 sequentially with red, green, and blue colors (with an optional or additional white color) for creation of an image using the field sequential color method. In an alternate embodiment the color wheel 610 is not present and the lamp 604 comprises separate red, green, blue and/or alternate color lamps for illumination of assembly 602 in the field sequential color method.

An illustration of a microlens array 607 and its alignment with respect to an array of shutter assemblies is depicted in FIG. 12C of U.S. patent application Ser. No. 11/218,690, incorporated above by reference. The microlens array 607 focuses light onto aperture regions within the array of shutter assemblies, such as the shutter array 502 within light modulation assembly 602. The use of microlens array 607 within the optics of projection display 600 improves the optical throughput and the brightness of the display. The microlens array can be designed with a 1 to 1 correspondence between microlenses and apertures within the array of shutter assembly. In alternate embodiments, such as where the shutter assemblies employ slotted apertures, multiple microlenses can be used to focus light onto each shutter assembly in the array of shutter assemblies. In alternate embodiments a single microlens can illuminate a group of shutter assemblies.

The shutter-based light modulator assembly 602 incorporates a transparent substrate, e.g. substrate 504, and the intrinsically fast MEMS-based shutter assemblies, such as shutter assemblies 400 or 502. The projection display system 600, therefore, combines the space and efficiency advantages of a transmissive mode of operation, while the faster MEMS shutter assemblies enable the economical use of field sequential color.

In order to reduce the size of shutter-based MEMS projector display apparatus, and to reduce the cost needed for large pieces of glass in the optical assemblies 606 and 608, it is further advantageous to construct the light modulator assembly 602 with the smallest field or die size possible. The thickness of the light modulator assembly plate 602 is between 0.2 and 2 mm. In lateral extent, the light modulator assembly is built in a range between about 1 cm to about 10 cm on a side.

Simultaneously, consumers prefer projection displays with high resolution-containing between 1000 and 2000 pixels per side of the image. If the power requirements for driving the image on the display apparatus approach or exceed one micro-watt per pixel, then the designer faces a situation where multiple watts of drive energy are dissipated within each square centimeter of the display assembly 602. Excessive heating of the light modulation assembly during operation therefore becomes a problem that needs to be solved.

Designs are therefore sought to minimize the drive energy required per pixel in the light modulation assembly 602. Generally, the power P dissipated per pixel is given by $$P = \tfrac{1}{2} f C V^2.$$

where C is the capacitance associated with the actuators in a shutter assembly, V is the voltage necessary to actuate a shutter assembly, and f is the frequency (per second) of actuation events in a pixel.

Several aspects of the shutter assembly 400 combine to reduce the power value P. In a first aspect, the capacitance is dominated by the capacitance between actuator beams in their actuated state, e.g. the actuator 402 in FIG. 4A, or in the actuator 205 or 303. In the transverse shutter design of shutter assembly 400 the capacitance is dominated by the contact area of the actuator beams. For transverse shutters, this contact area can as small as 2 microns (in height) by 20 microns in length.

In a second aspect, the transverse shutter-based light modulator 400 reduces the power value P per pixel by reducing the lateral displacement of the shutter assembly required for actuation, and thereby reducing the actuation voltage V required for actuation. A reduced voltage is achieved in part by the incorporation of slotted apertures as was described with respect to apertures 412 in FIGS. 4A and 4B above.

In a third aspect, the shutter-based light modulator 400 comprises actuators formed from two or more at least partially compliant beams. The dual-compliant actuators, such as illustrated by actuators 205 or 402 help to reduce the voltage required for actuation in the pixels of light modulation assembly 602.

In a fourth aspect, the transverse shutter design of shutter assembly 400 reduces the actuation voltage V by reducing the stiffness of the compliant actuator beams, such as is illustrated for actuators 205, 303, or 402. The more compliant or less stiff the beams, the less voltage is required to bend or flex them as part of an actuation step. The actuation voltage is generally proportional to the beam width raised to the $\tfrac{3}{2}$ power. For example, a beam with a width of 1 micron is a factor of 1/64 less stiff than a beam with a width of 4 microns and requires only 1/8 the voltage to displace it or deform it during actuation. Methods for constructing actuator beams where the width is substantially less than 2 microns, in other cases less than 1 micron, and in many cases as narrow as 0.2 microns, are described in co-pending U.S. patent application Ser. No. 11/361,785, incorporated herein by reference. In one such method a mold is provided such that the compliant beams are formed by thin films deposited on the sidewalls of the mold. The beam width is therefore controlled by the thickness of thin film deposited on the mold.

The invention may be embodied in other specific forms without departing from the spirit or essential characteristics thereof. The forgoing embodiments are therefore to be considered in all respects illustrative, rather than limiting of the invention.

What is claimed is:

1. A projection display comprising:
   a transparent substrate;
   a plurality of shutter-based MEMS light modulators disposed on a surface of the transparent substrate, wherein the shutter-based light modulators each include an actuator for driving a shutter, wherein the actuators include first and second compliant beams, which, in response to application of a voltage across the first and second compliant beams, deform towards one another; and
   projection optics for projecting light modulated by the shutter-based MEMS light modulators onto a display surface to form an image.

2. The projection display of claim 1, wherein the first compliant beam is free at one end to move towards the second compliant beam in response to the application of the voltage.

3. The projection display of claim 1, wherein the second beam is coupled to the shutter and the transparent substrate.

4. The projection display of claim 1, wherein the first compliant beam has a dimension parallel to the surface of the transparent substrate that is less than about 2.0 microns.

5. The projection display of claim 1, comprising a color wheel for generating a sequence of colors of light for modulation by the shutter-based MEMS light modulators.

6. The projection display of claim 1, wherein the first and second compliant beams are compliant in a direction parallel to the surface of the transparent substrate and are substantially rigid in a direction normal to the transparent substrate.

7. A projection display comprising:
   a transparent substrate;
   a plurality of shutter-based MEMS light modulators disposed on a surface of the transparent substrate, wherein one of the shutter-based light modulators includes a shutter configured for motion limited substantially to a plane that is parallel to the surface of transparent substrate, wherein the shutter includes mechanical supports coupled to the shutter for limiting motion of the shutter in a direction normal to the plane of the surface of the transparent substrate and at least one of the mechanical supports is anchored to the transparent substrate in at least two locations to reduce rotational movement of the shutter; and
   projection optics for projecting light modulated by the shutter-based MEMS light modulators onto a display surface to form an image.

* * * * *